(12) United States Patent
Zaino et al.

(10) Patent No.: US 11,196,710 B1
(45) Date of Patent: Dec. 7, 2021

(54) SYSTEMS AND METHODS FOR MONITORING AND SECURING NETWORKS USING A SHARED BUFFER

(71) Applicant: LookingGlass Cyber Solutions, Inc., Reston, VA (US)

(72) Inventors: Paolo Fabio Zaino, Brighton (GB); Bryan Wesley Brown, Baltimore, MD (US)

(73) Assignee: LookingGlass Cyber Solutions, Inc., Reston, VA (US)

( * ) Notice: Subject to any disclaimer, the term of this patent is extended or adjusted under 35 U.S.C. 154(b) by 0 days.

(21) Appl. No.: 17/168,392

(22) Filed: Feb. 5, 2021

(51) Int. Cl.
*H04L 29/06* (2006.01)
*H04L 12/741* (2013.01)
*H04L 12/717* (2013.01)

(52) U.S. Cl.
CPC .......... *H04L 63/0245* (2013.01); *H04L 45/42* (2013.01); *H04L 45/74* (2013.01); *H04L 63/1425* (2013.01)

(58) Field of Classification Search
CPC . H04L 63/0245; H04L 63/1425; H04L 45/42; H04L 45/74
USPC ........................................................... 726/26
See application file for complete search history.

(56) References Cited

U.S. PATENT DOCUMENTS

| | | | | |
|---|---|---|---|---|
| 7,484,083 B1 * | 1/2009 | Ilyasov | ................. | G06F 9/4411 713/1 |
| 8,264,976 B2 * | 9/2012 | Robinson | ................ | H04L 69/22 370/252 |
| 2003/0217184 A1 * | 11/2003 | Nair | .................... | H04L 49/9021 709/250 |
| 2018/0212885 A1 * | 7/2018 | Contavalli | ............ | H04L 47/193 |

* cited by examiner

*Primary Examiner* — Evans Desrosiers
(74) *Attorney, Agent, or Firm* — Bookoff McAndrews, PLLC

(57) ABSTRACT

Disclosed are systems and methods for securing a network including one or more network nodes connecting a plurality of network connected devices of the network. A method may include: receiving and temporarily storing a plurality of data packets in a shared buffer of a network node; receiving requests from a first processing engine and a second processing engine to access a temporarily stored data packet; generating a first pointer and a second pointer to the temporarily stored data packet, the second pointer being different from the first pointer while pointing to the same temporarily stored data packet; and enabling the first processing engine to use the generated first pointer to access the temporarily stored data packet and the second processing engine to use the generated second pointer to access the temporarily stored data packet.

20 Claims, 5 Drawing Sheets

SYSTEMS AND METHODS FOR MONITORING AND SECURING NETWORKS USING A SHARED BUFFER

TECHNICAL FIELD

The present disclosure relates to systems and methods of monitoring and securing a network and, more particularly, to systems and methods of using a shared buffer and pointers for analyzing network traffic.

BACKGROUND

Analysis of network traffic often involves multiple tools to observe the same data packet and/or session and using such tools to correlate context across multiple data sources. Conventional methods and systems for network traffic analysis achieve this by copying network traffic across multiple tools which considerably reduces performance. For example, a network packet may be copied across multiple buffers to allow different tools and/or processes to access the same network packet at the same time. Accordingly, such methods and systems for network traffic analysis are not effective or operable in higher scale network environments.

Therefore, there is a need for systems and methods monitoring and securing a network that achieve higher performance and efficiency in network traffic analysis.

SUMMARY OF THE DISCLOSURE

Embodiments of the present disclosure include systems and methods for monitoring and securing a network.

According to certain embodiments, a computer-implemented method for securing a network comprising one or more network nodes connecting a plurality of network connected devices of the network is disclosed. The computer-implemented method may include: receiving a plurality of data packets at a network node of the network; temporarily storing the received data packets in a shared buffer of the network node; receiving a first request transmitted by a first processing engine to access a first temporarily stored data packet; establishing a connection with the first processing engine; generating a first pointer to the first temporarily stored data packet; enabling the first processing engine to use the generated first pointer to access the first temporarily stored data packet; receiving a second request transmitted by a second processing engine to access the first temporarily stored data packet; establishing a connection with the second processing engine; generating a second pointer to the first temporarily stored data packet, the second pointer being different from the first pointer while pointing to the same first temporarily stored data packet; and enabling the second processing engine to use the generated second pointer to access the first temporarily stored data packet.

In accordance with another embodiment, a network node of a network including one or more network nodes connecting a plurality of network connected devices of the network is disclosed. The network node may include: a data storage device storing processor-readable instructions; and a processor configured to execute the instructions to perform a method. The method may include: receiving a plurality of data packets at a network node of the network; temporarily storing the received data packets in a shared buffer of the network node; receiving a first request transmitted by a first processing engine to access a first temporarily stored data packet; establishing a connection with the first processing engine; generating a first pointer to the first temporarily stored data packet; enabling the first processing engine to use the generated first pointer to access the first temporarily stored data packet; receiving a second request transmitted by a second processing engine to access the first temporarily stored data packet; establishing a connection with the second processing engine; generating a second pointer to the first temporarily stored data packet, the second pointer being different from the first pointer while pointing to the same first temporarily stored data packet; and enabling the second processing engine to use the generated second pointer to access the first temporarily stored data packet.

In accordance with another embodiment, a network node of a network including one or more network nodes connecting a plurality of network connected devices of the network is disclosed. The network node may include non-transitory computer-readable medium containing instructions that, when executed by a processor, cause the processor to perform a method. The method may include: receiving a plurality of data packets at a network node of the network; temporarily storing the received data packets in a shared buffer of the network node; receiving a first request transmitted by a first processing engine to access a first temporarily stored data packet; establishing a connection with the first processing engine; generating a first pointer to the first temporarily stored data packet; enabling the first processing engine to use the generated first pointer to access the first temporarily stored data packet; receiving a second request transmitted by a second processing engine to access the first temporarily stored data packet; establishing a connection with the second processing engine; generating a second pointer to the first temporarily stored data packet, the second pointer being different from the first pointer while pointing to the same first temporarily stored data packet; and enabling the second processing engine to use the generated second pointer to access the first temporarily stored data packet.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
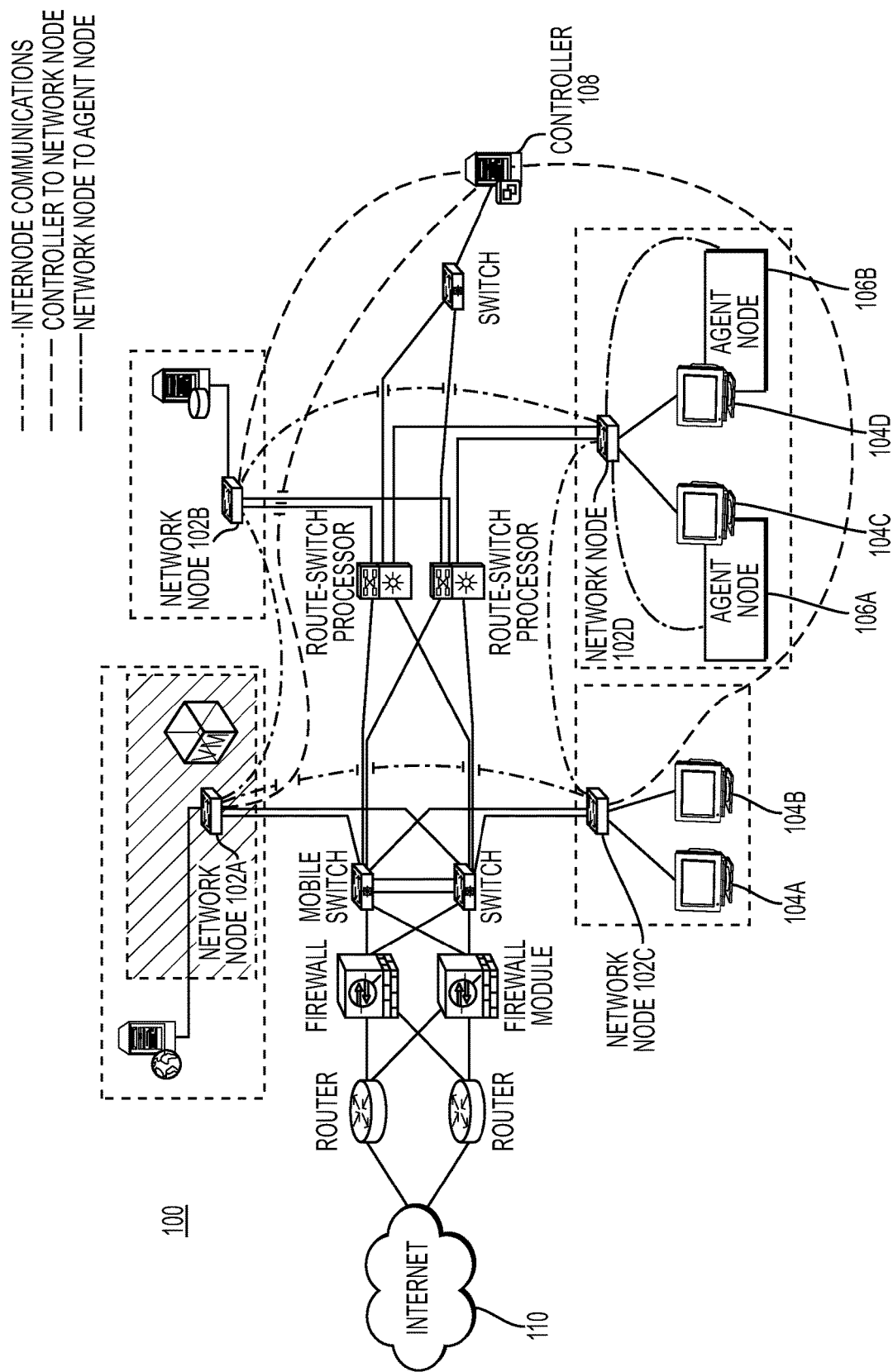
FIG. 1 depicts a schematic diagram illustrating an example of a computer network and environment within which the computer systems and methods disclosed herein are implemented according to some embodiments of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure is directed to systems and methods for software defined packet coordination. In the context of the current disclosure, "software defined packet coordination" refers to any desired techniques for monitoring packets of a network, e.g., analyzing individual packets within network traffic to detect security threats, in accordance to the embodiments disclosed herein. In particular, the present disclosure is directed to the use of a circular buffer to temporarily store packets passing through the network to allow multiple parallel security processes to access and analyze the same packet, without copying, duplicating, or backing up copies of the packet. For example, a packet temporarily stored in the circular buffer may be accessible via one or more pointers, and each security process may be assigned a separate pointer to access and analyze the same temporarily stored packet without the need to copy the packet for each security process.

In some embodiments, systems for software defined coordination may include the following components as will be described in further detail below: one or more shared buffers configured to store incoming network packets, software pipes created on top of the shared buffers that may allow the buffer to be accessed as shared memory across multiple processes, multiple pointers that may allow each process to access the buffers, and a controller (also referred to as a packet coordinator) configured to coordinate the aforementioned components.

In some embodiments, the packet coordinator may be configured to coordinate the one or more buffers, the software pipes, and the multiple pointers such that multiple separate processes may access the same data packet without the need to copy the data packet for each process. In some embodiments, the one or more shared buffers may be configured to store incoming data packets such that the packet coordinator may coordinate access to the stored data packets. In some embodiments, the one or more shared buffers may be shared circular packet buffers. In some embodiments, the packet coordinator may be configured to establish one or more software pipes such that a process may utilize a software pipe to access a pointer which may point to a packet in a shared buffer. In the context of the current disclosure, a software pipe may be referred to as a temporary software connection, for example, a temporary connection between a process and a shared buffer. Each stored packet in the one or more shared buffers may become accessible via a shared pointer. In the context of the current disclosure, shared pointers may refer to more than two pointers pointing to a same stored data packet. For example, a first process may be assigned a first pointer, e.g., by the packet coordinator, that points to a stored data packet and a second process may be assigned a second pointer, e.g., by the packet coordinator, that also points to the same stored data packet. Accordingly, the first and second pointers each "share" the same stored data packet. Hence, both the first and second pointers may be referred to as first and second shared pointers, respectively.

As will be described in further detail below, software defined packet coordination may allow multiple processes to access the same data packet and simultaneously analyze the same data packet, e.g., perform a security analysis of the same data packet, without contention.

Some advantages provided by the embodiments disclosed herein may include: (1) elimination of the need to generate a copy of a data packet, thereby avoiding unnecessary memory usage and the enhancing performance; (2) coordination of access by multiple processes to the same packet to prevent concurrency; and (3) allowing of any process to take or initiate action over a stored packet and/or session without causing disruption and invalid pointers to other processes still analyzing the same packet and/or session.

Turning now to the figures, FIG. 1 shows a block diagram of a computer network and environment (hereinafter referred to as system 100) for implementing embodiments of the present disclosure, or aspects thereof. System 100 may include one or more network nodes 102A-102D, one or more endpoints 104A-104D, one or more agent nodes 106A-106B, and one or more controllers 108. As shown in FIG. 1, one or more switches, firewall modules, routers, and/or router-switch processors may interconnect the aforementioned network nodes 102A-102D, endpoints 104A-104D, agent nodes 106A-106B, and/or controllers 108. The network nodes 102A-102D, endpoints 104A-104D, agent nodes 106A-106B, and/or controllers 108 may be connected to the internet 110 through the one or more switches, firewall modules, routers, and/or router-switch processors. It is understood that the system 100 may include less than or more than the number of network nodes, endpoints, agent nodes, and/or controllers depicted in the FIG. 1 in other embodiments.

The one or more network nodes 102A-102D may form a distributed control plane. The controller 108 may be configured to manage the distributed control plane. In some embodiments, the controller 108 may manage the distributed control plane by alerting, automating, and/or implementing workflow integrations for the network nodes 102A-102D. Accordingly, the controller 108 may be referred to as a policy decision point for the system 100. For example, policies such as automation and/or workflow integrations for the one or more network nodes 102A-102D may be determined by the controller 108. In some embodiments, any combination of the one or more network nodes 102A-102D may comprise the controller 108.

The one or more network nodes 102A-102D may be configured to provide visibility to a network associated with each respective network node 102A-102D and enforce predetermined policies, e.g., automation and/or workflow integrations. For example, network nodes 102A-102D may provide connection reports, e.g., to the controller 108, to provide such visibility. In some embodiments, the controller 108 may update policies for the one or more network nodes 102A-102D based on such reports.

In some embodiments, a network node 102A may provide access to a perimeter network including DMZ services, such as, web servers, mail servers, FTP servers, VoIP servers, and the like. In the context of the current disclosure, DMZ services (demilitarized zone services) may refer to a perimeter network that may be a physical or logical subnetwork that contains and exposes an organization's external-facing services to an untrusted network such as the Internet. In such embodiments, network node 102A may provide visibility to the perimeter network and enforce predetermined polices for the perimeter network. In some embodiments, a network node 102B, 102D may provide access to an internal network Local Area Network (LAN), such as a database workgroup, user workgroup, port, VLAN, application, network services, and the like. In such embodiments, network node 102B, 102D may provide visibility to the internal LAN and enforce predetermined policies for the internal network LAN. For example, network node 102B, 102D may transmit information including processes, users, and/or files associated with each respective network. In some embodiments, a network node 102C may be associated with (e.g., provide access to) cloud networks such as an object storage service (e.g., S3 bucket). In such embodiments, network node 102C may provide visibility to the cloud network and enforce predetermined policies for the cloud network.

In some embodiments, a network node 102D may communicate with one or more agent nodes 106A-106B associated with one or more endpoints 104C-104D. The one or more endpoints 104C-104D may include one or more network connected devices according to some embodiments. In the context of the current disclosure, a network connected device may refer to any physical device connected to a network whether local or remote, as well as any virtual devices and/or virtual services (e.g., micro-services) running on such devices included in the network or remote from the network. For example, a network connected device may include any computing device, e.g., server, a mobile device, a desktop computer, a payment terminal with a computer chip, etc. or any other device or service in communication with the network. The network node 102D may obtain information regarding the one or more endpoints 104C-104D via the one or more agent nodes 106A-106B, as will be described in further detail below.

Agent nodes 106A-106B may provide visibility regarding each associated endpoint 104C-104D and may also enforce predetermined policies for the endpoints 104C-104D. In some embodiments, an agent node 106A-106B may comprise a browser plugin, a process memory-dumper, plugin framework, etc. For example, a browser plugin may be configured to detect malicious URLs inside encrypted connections. As another example, a process memory-dumper may be configured to inspect and capture in-memory and running processes. The process memory-dumper may be further configured to automate connection to a controller 108 for disassembly and forensic analysis. As yet another example, plugin framework may provide extensions for additional host-based detection, deception and mitigation capabilities via SQL query (e.g., OSQuery).

Agent nodes 106A-106B may be configured to query any software, e.g., installed on an endpoint 104C-104D, without requiring the software to be running. In some embodiments, agent nodes 106A-106B may detect vulnerable software across an organization, e.g., system 100, thereby providing useful information for asset inventory and compliance. For example, the agent nodes 106A-106B may query for and determine vulnerable versions of a web browser. In some embodiments, agent nodes 106A-106B may be configured to query any active processes and related connections. For example, the agent nodes 106A-106B may query for a specific open port. As another example, the agent nodes 106A-106B may query for any open remote ports. The agent nodes 106A-106B may be configured to query active users and associated processes and connections. For example, the agent nodes 106A-106B may query user executed specific process and retrieve the process path. As another example, the agent nodes 106A-106B may query file-less processes with remote connections. In some embodiments, the agent nodes 106A-106B may perform queries on any connected devices.

Figure 2:
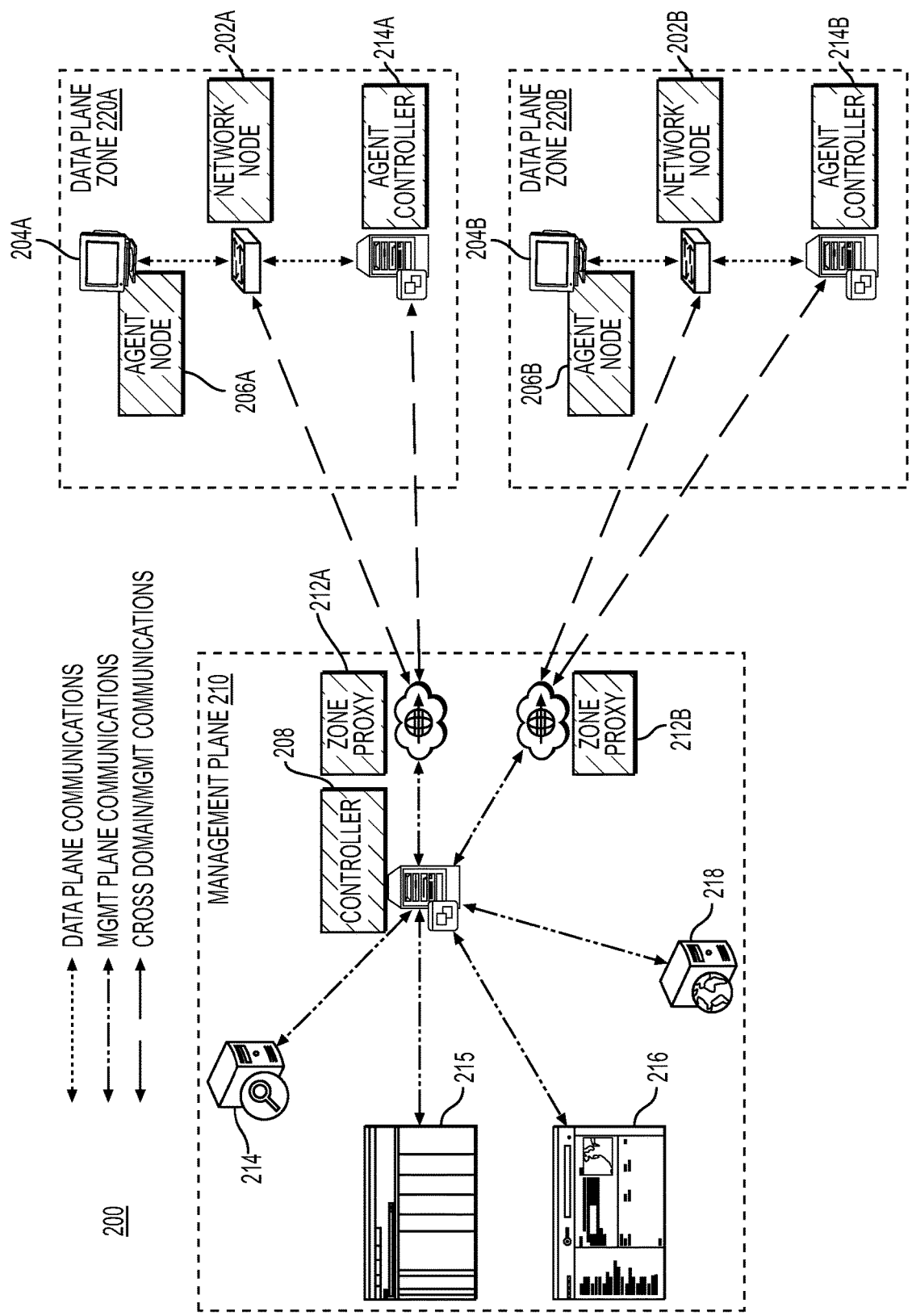
FIG. 2 depicts a schematic diagram illustrating an example of a computer network and environment within which the computer systems and methods disclosed herein are implemented according to some embodiments of the present disclosure.

FIG. 2 shows a block diagram of a computer network and environment (hereinafter referred to as system 200) for implementing embodiments of the present disclosure, or aspects thereof. As shown in FIG. 2, the system 200 may comprise a management plane 210 including a controller 208, a first zone proxy 212A, a second zone proxy 212B, security information and event management system (SIEM) 214, security operations workflow management system 215, intelligence scoring system 216, and openflow controller 218. SIEM 214 may be configured to aggregate and/or view security logs and alerts. Security operations workflow management system 215 may be configured to coordinate threat mitigation based on certain triggers, e.g., such as certain detected threats, and invoke changes in the system 200 to mitigate the threat and/or reflect the coordinated threat mitigation. Intelligence scoring system 216 may be configured to aggregate information associated with identified and/or potential threats, e.g., information provided by external systems and/or information based on threats detected and mitigated by the system 200, and determine scores for threats relevant to system 200. In some embodiments, an openflow controller 218 may be configured to use the OpenFlow protocol to connect and configured network devices, e.g., one or more switches, firewall modules, routers, and/or router-switch processors as depicted in FIG. 1, to determine optimal paths for network traffic. It is understood that the openflow controller 218 may be any appropriate software-defined network (SDN) controller in some embodiments. System 200 may further comprise one or more data plane zones 220A-220B. As shown in FIG. 2, each data plane zone 220A-220B may include a network node 202A-202B, an endpoint 204A-204B, an agent node 206A-206B, and an agent controller 214A-214B. An agent controller 214A-214B may be configured to communicate with a zone proxy 212A-212B and manage one or more associated agent node 206A-206B, as will be described in further detail below.

The controller 108 may manage each data plane zone 220A-220B via a dedicated proxy 212A-212B as shown in FIG. 2. It is understood that there may be less than or more than two data plane zones in other embodiments. Cross domain communications, e.g., communications between the management plane 210 and the data plane zones 220A-220B, may be performed via the proxy 212A-212B and each dedicated data plane zone 220A-220B, e.g., network node 202A-202B and/or agent controller 214A-214B. Accordingly, zone-specific actions may be defined by the management plane 210 and dynamically managed throughout the system 200.

In some embodiments, management plane 210 communications may include policy, intelligence, distribution, and/or monitoring and/or statistics. For example, the controller 208 may transmit information including logging, events, and/or alerts to the SIEM 214. As another example, the controller 208 may perform workflow orchestration based on the security operations workflow system 215. As another example, the controller 208 may obtain threat scores from the intelligence scoring system 216. As yet another example, the controller 208 may communicate with the openflow controller 218 to determine optimal paths for network traffic. In some embodiments, management plane 210 communications may be encrypted.

In some embodiments, data plane communications may include communication between the agent controller 214A-214B and the agent node 206A-206B. An agent controller 214A may be configured to manage one or more agent nodes 206A within data plane zone 220A. The agent controller 214A may be configured to provide configuration management to agent node 206A and transmit image distribution and log aggregation information from the agent node 206 to the management plane 210 via zone proxy 212A. It is understood that data plane zone 220A may include two or more agent nodes each associated with a separate endpoint in other embodiments. In such embodiments, the agent controller 214A may be configured to manage the two or more agent nodes in data plane zone 220A.

Figure 3:
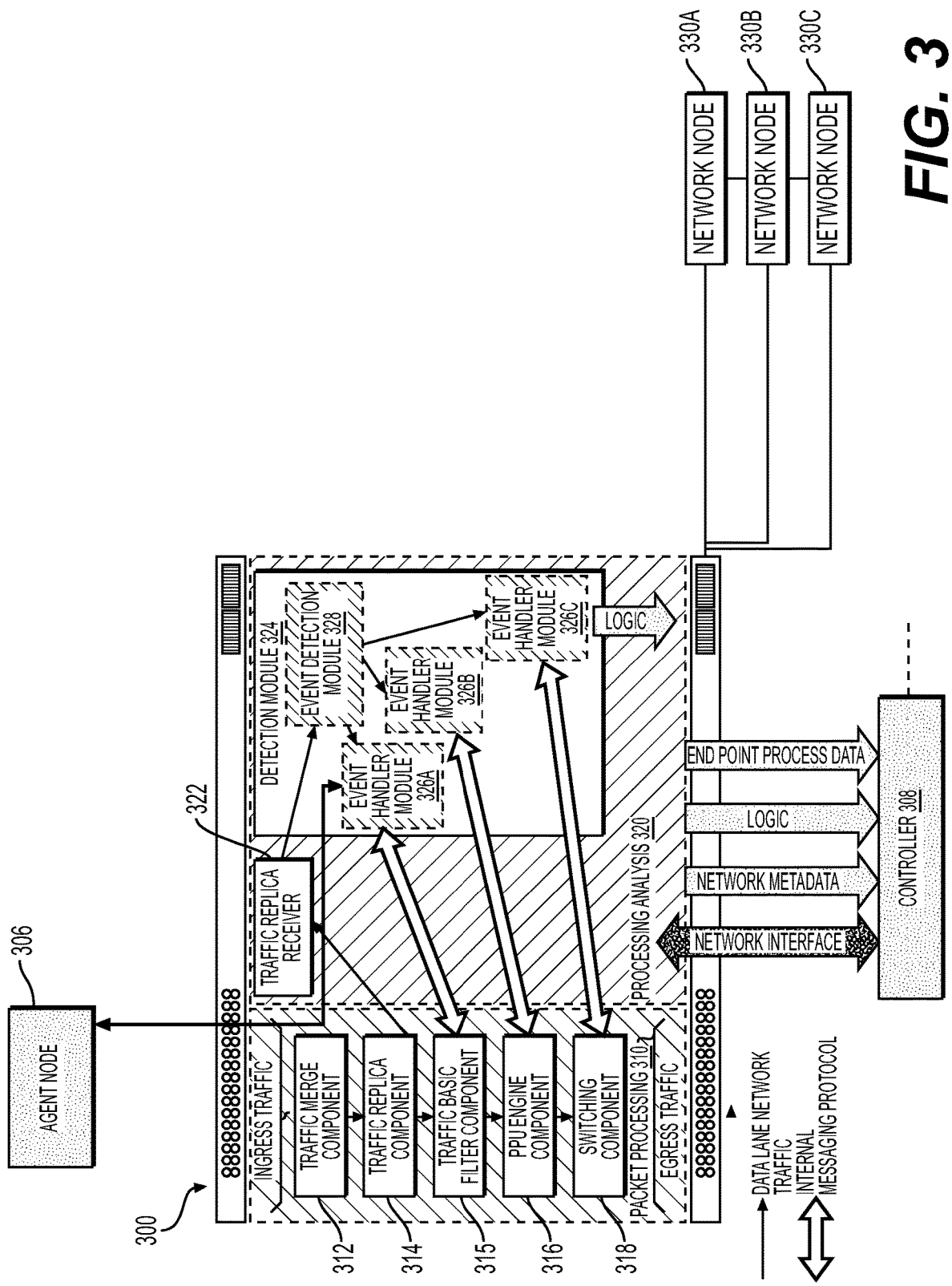
FIG. 3 depicts an exemplary network node according to embodiments of the present disclosure.

FIG. 3 depicts a network node 300, according to some embodiments. The network node 300 may include a packet processing engine 310 and a processing analysis engine 320, according to some embodiments. While only one processing analysis engine 320 is depicted in FIG. 3, it is understood that the network node 300 may include two or more processing analysis engines in other embodiments.

In some embodiments, the packet processing engine 310 may be deployed inline to a network. The packet processing engine 310 may receive ingress data packets, e.g., IPv4 and/or IPv6 data packets. In some embodiments, the packet processing engine 310 may include a traffic merge component 312 in which the received data packets may be temporarily stored. The packet processing engine 310 may forward each received data packet to the processing analysis engine 320. The packet processing engine 310 may include a traffic replica component 314 configured to generate a replica of each temporarily stored data packet. In some embodiments, the traffic replica component 314 may be configured to generate a pointer for each temporarily stored data packet. In such embodiments, the traffic replica component 314 may share the generated pointers with the processing analysis engine 320, thereby enabling the processing analysis engine 320 to use the generated pointers to access the stored data packets. Some embodiments of the traffic merge component 312 and the traffic replica component 314, e.g., shared buffer 402 and packet coordinator 404, respectively, are depicted in and described below with reference to FIG. 4.

The packet processing engine 310 may further include a traffic basic filter component 315 configured to check if one or more attributes associated with the temporarily stored data packets match predetermined attributes. For example, the predetermined attributes may include a source, destination IP, port, protocol, etc. In some embodiments, the predetermined attributes may be associated with data packets, sessions, and/or data flow that may be malicious, e.g., C2 and/or exfiltration malware. If attributes associated with one or more data packets do not match predetermined attributes, the one or more data packets may be forwarded to the intended destination via a switching component 318.

If attributes associated with the temporarily stored one or more data packets matches the predetermined attributes, an Packet Processing Unit (PPU) engine component 316 may be configured to perform a dynamic action on the one or more data packets, a session associated with the one or more data packets, and/or a data flow associated with the one or more data packets. In some embodiments, the PPU engine component 316 may comprise a micro-program that includes an activation rule and micro-compiled code that is executed if the activation rule matches. In some embodiments, the micro-compiled code may be executed to respond to, copy, drop, route, and/or modify the one or more data packets. In some embodiments, the PPU engine component 316 may further include state and memory useful for subsequent re-execution of the micro-program. The micro-program may further include executing a program, one or more data packets, a session, and/or a data flow based on the one or more data packets. The micro-program may comprise of both states and instructions. In some embodiments, the one or more data packets may be transparently routed to a deception server. In the context of the current disclosure, a deception server may be referred to a server that acts like a legitimate server for the purpose of gathering information about a malicious actor and/or entity (also referred to collectively as "adversary") including what the adversary is trying to exploit and where the adversary is trying to gather information from. For example, the deception server may be utilized to detect SQL injection attempts. In some embodiments, the one or more data packets may reflect un-allowed traffic to bad domains. In such embodiments, the one or more data packets may be detected and redirected without detection by an adversary. In some embodiments, the one or more data packets may reflect encrypted malware. In such embodiments, the threat may be mitigated by dropping the one or more data packets.

The packet processing engine 310 may communicate such performed dynamic actions to the controller 308 and/or one or more network nodes 330A-330C. In such embodiments, the controller 308 and/or the one or more network nodes 330A-330C may dynamically detect and mitigate similar data packets based on the communication.

The processing analysis engine 320 may include a traffic replica receiver 322 configured to receive replicas of the temporarily stored data packets for a deep analysis of the data packets. The data packet replicas may be utilized by the detection module 324, which may include an event detection module 328 and one or more event handler modules 326A-326C. The detection module 328 may be configured for a deep analysis of sessions, file extractions, intelligence correlation, and many other similar higher-level data signals analysis performed across multiple packet contexts including network and endpoint information. For example, the event detection module 328 may be configured to detect predetermined protocols and/or malware. In the context of the current disclosure, intelligence correlation may refer to identifying attributes associated with detected IPs, domains, C2s, and behaviors and utilizing such identified attributes to detect similar associated threats in other environments. Each detected protocol and/or malware may be referred to as an event, and the event handler modules 326A-326C may be configured to perform an analysis of an event. In some embodiments, an event handler module 326A may obtain information from an agent node 306 regarding an associated endpoint. The agent node 406 may provide visibility to a process, user information associated with executing the process, network and/or file state on the endpoint, and/or ownership of files such that the information gained by that visibility may be used by the event handler module 326A for detection and coordination with the packet processing engine 310. For example, the event handler module 326A may query for information, run scans for malware on demand, and/or collect process images. Each of the event handler modules 326A-326C may be configured to detect predetermined protocols and/or obtain PPUs based on mitigation and detection macro-logic. For example, the event handler modules 326A-326C may obtain and/or generate micro-programs that include an activation rule and micro-compiled code that may be executed if the activation rule matches. The event handler modules 326A-326C may deploy such micro-programs to the packet processing engine 310 (e.g., traffic basic filter component 315, PPU engine component 316, and/or switching component 318).

In some embodiments, the controller 308 may receive messages from the packet processing engine 310, the agent node 306, and the processing analysis engine 320 such that those messages may be processed, organized and redistributed to other connected components, such as other network nodes 330A-330C, based on predetermined policies. For example, the controller 308 may perform a security analysis of the network including the network node 300, log the analysis, and/or perform and protocol or malware analysis based on the received messages. In some embodiments, the received messages may include endpoint process data obtained from the agent node 406, network metadata, associated PPUs, etc.

Figure 4:
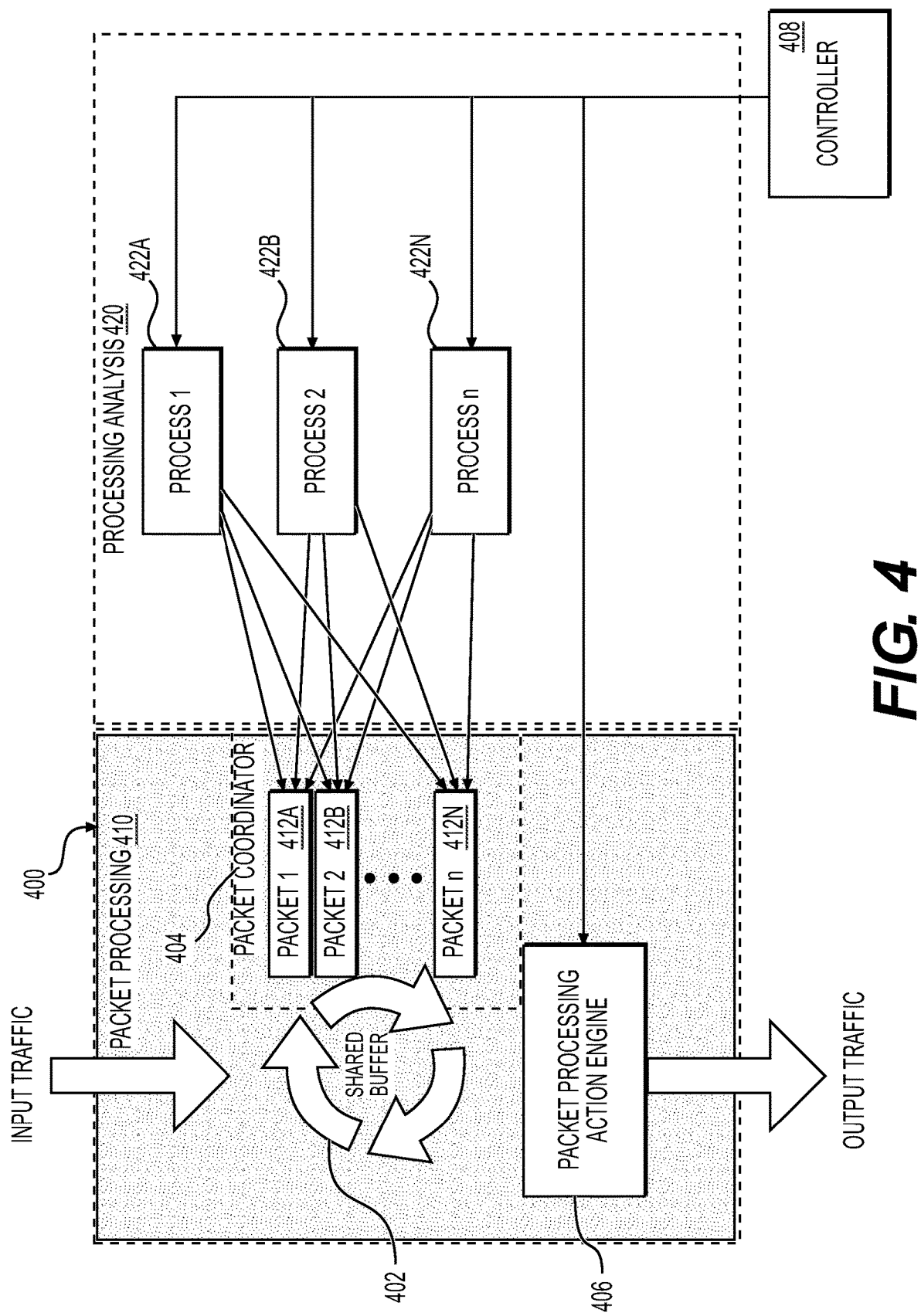
FIG. 4 depicts an exemplary network node according to embodiments of the present disclosure.

FIG. 4 depicts a network node 400, according to some embodiments. The network node 400 may include a packet processing engine 410 and a processing analysis engine 420, according to some embodiments. While only one deep engine 420 is depicted in FIG. 4, it is understood that the network node 400 may include two or more processing analysis engines in other embodiments.

The packet processing engine 410 may include one or more shared buffers 402, a packet coordinator 404, and a packet processing action engine 406, according to some embodiments. As described above with reference to FIG. 3, the packet processing engine 410 may be deployed inline to a network. The packet processing engine 410 may receive ingress data packet, e.g., IPv4 and/or Ipv6 data packets. In some embodiments, the received data packets may be temporarily stored in the one or more shared buffers 402. In some embodiments, the one or more shared buffers 402 may include one or more circular packet buffers. The use of circular packet buffers maintains optimal performances while continuously receiving ingress data packets. The processing analysis engine 420 may include one or more processes 422A-422N that may request access to packets temporarily stored in the shared buffers 402 to, for example, analyze the incoming packets. It should be understood that the one or more processes 422A-422N may be located in one or more processing analysis engines in other embodiments. For example, processes 422A and 422B may be located in the processing analysis engine 420, and a separate process may be located in a separate processing analysis engine. It should be further understood that the separate processing analysis engine may be located in the network node 400 or a separate network node. That is, one or more processes of a separate processing analysis engine of the network node 400 and/or a separate network node may request access to packets temporarily stored, e.g., packets 412A-412N, in the shared buffers 402. In some embodiments, the one or more processes 422A-422N may include one or more event handler modules 326A-326C, event detection modules 328, and/or detection modules 324, as described above with reference to FIG. 3.

The packet coordinator 404 may coordinate requests from multiple separate processes, e.g., processes 422A-422N, to access the same temporarily stored packet without the need to copy the packet for each process. In some embodiments, the packet coordinator 404 may generate a software pipe between each of the requesting processes 422A-422N and the shared buffer 402 such that the shared buffer 402 may be accessed as shared memory across multiple processes 422A-422N. That is, the packet coordinator 404 may establish temporary connections between each requesting process 422A-422N and the shared buffer 402 such that the requesting processes 422A-422N may access packets temporarily stored, e.g., packets 412A-412N, in the shared buffer 402. Accordingly, the requesting processes 422A-422N may each access a same temporarily stored packet simultaneously or in any order. In some embodiments, the requesting processes 422A-422N may access temporarily stored packets in the shared buffer 402 via respective software pipes and one or more shared pointers. In such embodiments, the requesting processes 422A-422N may use each respective software pipe to access one or more shared pointers, each of which point to a packet temporarily stored in the shared buffer 402, as will be described in further detail below.

The packet coordinator 404 may generate a shared pointer pointing to a temporarily stored packet for each process, e.g., processes 422A-422N, requesting access to the temporarily stored packet. For example, the packet coordinator 404 may generate a first shared pointer pointing a packet temporarily stored, e.g., packet 412A, in the shared buffer 402 upon receiving a request from a first process, e.g., process 422A, to access the temporarily stored packet 412A. The first shared pointer may be assigned to process 422A, and the assigned first shared pointer may be transmitted and/or otherwise shared with the process 422A such that the process 422A may use the first shared pointer to access the temporarily stored packet 412A. The packet coordinator 404 may generate a second shared pointer pointing to the same temporarily stored packet 412A in the shared buffer 402 upon receiving a request from a second process, e.g., process 422B, to access the same temporarily stored packet 412A. Similarly, the second shared pointer may be assigned to process 422B, and the assigned second shared pointer may be transmitted and/or otherwise shared with the process 422B such that the process 422B may use the second shared pointer to access the same temporarily stored packet 412A. It is understood that more than two shared pointers may be generated, where each shared pointer may be assigned to a separate process and points to the same packet. Similarly, it should also be understood that more than one shared pointer may be generated for a specific process. For example, the specific process may transmit two or more requests to access two or more temporarily stored packets. In such instances, the packet coordinator 404 may generate a shared pointer corresponding to each request, such that the specific process may use each respective shared pointer to access the corresponding packet temporarily stored in the shared buffer 402.

Accordingly, the one or more processes 422A-422N may be enabled to access a same packet temporarily stored in the shared buffer 402 and perform analysis, e.g., security analysis, of the packet without contention. In some embodiments, a process may determine that an action must be taken over the temporarily stored packet (hereinafter referred to as "identified packet") based on the performed analysis. For example, the identified packet may be determined to be part of a security threat to a network. In such embodiments, the process may dynamically transmit a request to the packet coordinator 404 to take the appropriate action on the identified packet. For example, the process may transmit a message to the packet coordinator 404 to drop the identified packet and/or a session associated with the identified packet such that there are no concurrent actions taken over the identified packet by other processes. As there is just the identified packet temporarily stored in the shared buffer 402 and no copies of the identified packet, such actions may be performed effectively and efficiently, especially in instances in which many processes (or multiple instances of the same process) request access to each temporarily stored packet.

In some embodiments, the action may be performed by the packet coordinator 404 and/or the packet processing action engine 406. In some embodiments, the packet processing engine 406 may comprise the PPU engine component 316 as described above with reference to FIG. 3. Accordingly, packet processing action engine 406 may be configured to perform a dynamic action on the identified packet, a session associated with the identified data packet, and/or a data flow associated with the identified data packet. For example, the packet processing action engine 406 may respond to, copy, drop, route, and/or modify the identified data packet, as described in further detail above with reference to FIG. 3. It should be understood that any combination of the packet coordinator 404 and the packet processing action engine 406 may be configured to perform the functions of the PPU engine component 316 in some embodiments.

In some embodiments, information regarding the performed action may be transmitted to a controller 408, e.g., controllers 108, 208, 308 as described above with reference to FIGS. 1-3, the processes 422A-422N, and/or other network nodes. The controller 408 may monitor and/or analyze network traffic associated with the network node 400 based on such received information. In some embodiments, one or more of the processes 422A-422N, the packet coordinator 404, and/or the packet processing action engine 406 may transmit information regarding a current status of each respective component and associated data packet 412A-412N. The controller 408 may monitor and/or analyze network traffic associated with the network node 400 based on this information. In some embodiments, the controller 408 may be configured to control (e.g., perform actions) network traffic associated with the network node 400 based on the information received from the aforementioned components. That is, the network traffic directed to, directed from, and/or currently stored in the network node 400 may be controlled from a single point, e.g., the controller 408.

Figure 5:
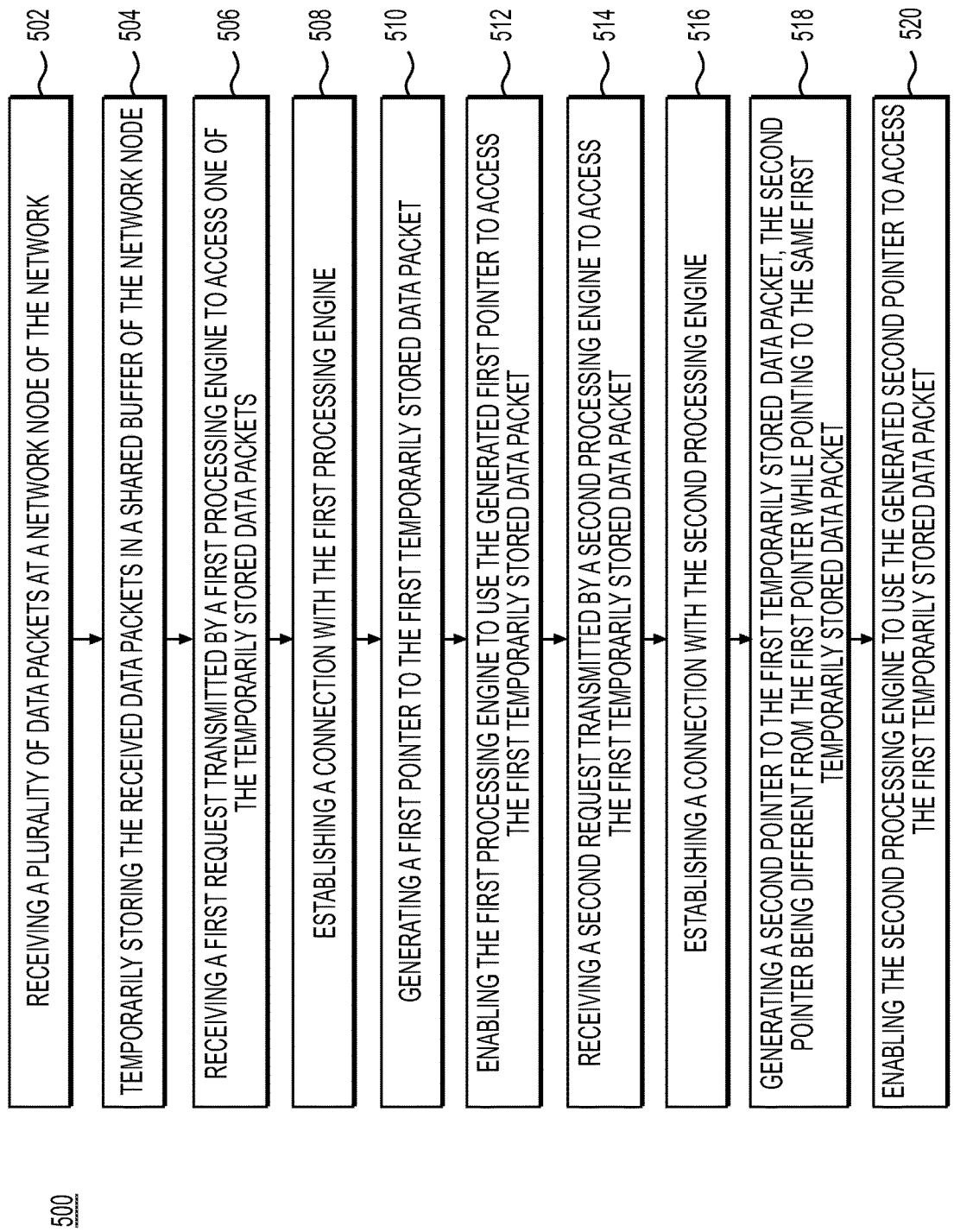
FIG. 5 depicts an exemplary method for securing a network comprising one or more network nodes connected a plurality of network connected devices of the network, according to exemplary embodiments of the present disclosure.

FIG. 5 depicts an exemplary method 500 for securing a network comprising one or more network nodes connecting a plurality of network connected devices of the network according to some embodiments. The method 500 may begin with step 502 in which a plurality of data packets may be received at a network node of the network. In step 504, the received data packets may be temporarily stored in a shared buffer of the network node. In some embodiments, the shared buffer may be a shared circular buffer.

In step 506, a first request transmitted by a first processing engine to access a first temporarily stored data packet may be received. In step 508, a connection may be established with the first processing engine. In step 510, a first pointer to the first temporarily stored data packet may be generated. In step 512, the first processing engine may be enabled to use the generated first pointer to access the first temporarily stored data packet.

In step 514, a second request transmitted by a second processing engine to access the first temporarily stored data packet may be received. In step 516, a connection with the second processing engine may be established. In step 518, a second pointer to the first temporarily stored data packet may be generated, where the second pointer is different from the first pointer while pointing to the same first temporarily stored data packet. In step 520, the second processing engine may be enabled to use the generated second pointer to access the first temporarily stored data packet.

In some embodiments, process 500 may include a further step in which a message regarding the first temporarily stored data packet may be received from the first processing engine and/or the second processing engine. In such embodiments, the first temporarily stored data packet may be processed based on the received message, wherein processing the first temporarily stored data packet may include dropping the first data packet from the buffer, routing from the buffer, and/or modifying the data packet. In some embodiments, the first processing engine, the second processing engine, and/or a controller may be notified regarding the processed first temporarily stored data packet.

In some embodiments, process 500 may include a further step in which a third request transmitted by a third processing engine to access the first temporarily stored data packet. In some embodiments, a connection with the third processing engine may be established. In some embodiments, a third pointer to the first temporarily stored data packet may be generated. The third pointer may be different from the first and second pointer while pointing to the same first temporarily stored data packet. In some embodiments, the third processing engine may be enabled to use the generated third pointer to access the first temporarily stored data packet.

In some embodiments, the network node may include the first processing engine. In some embodiments, the network node may include the shared buffer and a remote network node may include the second processing engine.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for securing a network comprising one or more network nodes connecting a plurality of network connected devices of the network, the method comprising:
   receiving a plurality of data packets at a network node of the network;
   temporarily storing the received data packets in a shared buffer of the network node;
   receiving a first request transmitted by a first processing engine to access a first temporarily stored data packet of the temporarily stored data packets;
   establishing a first connection between the first processing engine and the shared buffer;
   generating a first pointer to the first temporarily stored data packet using the established first connection;

enabling the first processing engine to use the generated first pointer to access the first temporarily stored data packet using the established first connection;

receiving a second request transmitted by a second processing engine to access the first temporarily stored data packet;

establishing a second connection between the second processing engine and the shared buffer;

generating a second pointer to the first temporarily stored data packet using the established second connection, the second pointer being different from the first pointer while pointing to the same first temporarily stored data packet; and enabling the second processing engine to use the generated second pointer to access the first temporarily stored data packet using the established second connection, wherein the enabling allows the first processing engine and the second processing engine to access the first temporarily stored data packet simultaneously.

2. The computer-implemented method of claim 1, wherein the shared buffer is a shared circular buffer.

3. The computer-implemented method of claim 1, further comprising:

receiving a third request transmitted by a third processing engine to access the first temporarily stored data packet;

establishing a third connection between the third processing engine and the shared buffer;

generating a third pointer to the first temporarily stored data packet using the established third connection; and enabling the third processing engine to use the generated third pointer to access the first temporarily stored data packet using the established third connection.

4. The computer-implemented method of claim 1, further comprising:

receiving a message regarding the first temporarily stored data packet from the first processing engine and/or the second processing engine.

5. The computer-implemented method of claim 4, further comprising:

processing the first temporarily stored data packet based on the received message, wherein processing the first temporarily stored data packet comprises dropping the first data packet from the buffer, routing from the buffer, and/or modifying the data packet; and notifying the first processing engine, the second processing engine, and/or a controller regarding the processed first temporarily stored data packet.

6. The computer-implemented method of claim 1, wherein the network node comprises the first processing engine.

7. The computer-implemented method of claim 1, wherein the network node comprises the shared buffer and a remote network node comprises the second processing engine.

8. A network node of a network comprising one or more network nodes connecting a plurality of network connected devices of the network, the network node comprising:

a data storage device storing processor-readable instructions; and a processor configured to execute the instructions to perform a method including:

receiving a plurality of data packets;

temporarily storing the received data packets in a shared buffer of the network node;

receiving a first request transmitted by a first processing engine to access a first temporarily stored data packet of the temporarily stored data packets;

establishing a first connection between the first processing engine and the shared buffer;

generating a first pointer to the first temporarily stored data packet using the established first connection;

enabling the first processing engine to use the generated first pointer to access the first temporarily stored data packet using the established first connection;

receiving a second request transmitted by a second processing engine to access the first temporarily stored data packet;

establishing a second connection between the second processing engine and the shared buffer;

generating a second pointer to the first temporarily stored data packet using the established second connection, the second pointer being different from the first pointer while pointing to the same first temporarily stored data packet; and enabling the second processing engine to use the generated second pointer to access the first temporarily stored data packet using the established second connection, wherein the enabling allows the first processing engine and the second processing engine to access the first temporarily stored data packet simultaneously.

9. The network node of claim 8, wherein the shared buffer is a shared circular buffer.

10. The network node of claim 8, wherein the processor is further configured for:

receiving a third request transmitted by a third processing engine to access the first temporarily stored data packet;

establishing a third connection between the third processing engine and the shared buffer;

generating a third pointer to the first temporarily stored data packet using the established third connection; and enabling the third processing engine to use the generated third pointer to access the first temporarily stored data packet using the established third connection.

11. The network node of claim 8, wherein the processor is further configured for:

receiving a message regarding the first temporarily stored data packet from the first processing engine and/or the second processing engine.

12. The network node of claim 11, wherein the processor is further configured for:

processing the first temporarily stored data packet based on the received message, wherein processing the first temporarily stored data packet comprises dropping the first data packet from the buffer, routing from the buffer, and/or modifying the first data packet; and notifying the first processing engine, the second processing engine, and/or a controller regarding the processed first temporarily stored data packet.

13. The network node of claim 8, wherein the network node comprises the first processing engine.

14. The network node of claim 8, wherein the network node comprises the shared buffer and a remote network node comprises the second processing engine.

15. A network node of a network comprising one or more network nodes connecting a plurality of network connected devices of the network, the network node including non-transitory computer-readable medium containing instructions that, when executed by a processor, cause the processor to perform a method comprising:

receiving a plurality of data packets;

temporarily storing the received data packets in a shared buffer of the network node;

receiving a first request transmitted by a first processing engine to access a first temporarily stored data packet of the temporarily stored data packets;

establishing a first connection between the first processing engine and the shared buffer;

generating a first pointer to the first temporarily stored data packet using the established first connection;

enabling the first processing engine to use the generated first pointer to access the first temporarily stored data packet using the established first connection;

receiving a second request transmitted by a second processing engine to access the first temporarily stored data packet;

establishing a second connection between the second processing engine and the shared buffer;

generating a second pointer to the first temporarily stored data packet using the established second connection, the second pointer being different from the first pointer while pointing to the same first temporarily stored data packet; and enabling the second processing engine to use the generated second pointer to access the first temporarily stored data packet using the established second connection, wherein the enabling allows the first processing engine and the second processing engine to access the first temporarily stored data packet simultaneously.

16. The network node of claim 15, wherein the shared buffer is a shared circular buffer.

17. The network node of claim 15, the method further comprising:

receiving a third request transmitted by a third processing engine to access the first temporarily stored data packet;

establishing a third connection between the third processing engine and the shared buffer;

generating a third pointer to the first temporarily stored data packet using the established third connection; and enabling the third processing engine to use the generated third pointer to access the first temporarily stored data packet using the established third connection.

18. The network node of claim 15, the method further comprising:

receiving a message regarding the first temporarily stored data packet from the first processing engine and/or the second processing engine.

19. The network node of claim 18, the method further comprising:

processing the first temporarily stored data packet based on the received message, wherein processing the first temporarily stored data packet comprises dropping the first data packet from the buffer, routing from the buffer, and/or modifying the first data packet; and notifying the first processing engine, the second processing engine, and/or a controller regarding the processed first temporarily stored data packet.

20. The network node of claim 15, wherein the network node comprises the first processing engine, and wherein a remote network node comprises the second processing engine.

* * * * *